July 15, 1969  D. C. LINDLEY  3,455,760
METHOD FOR APPLYING HANDLES TO PLASTIC BAGS
Filed July 5, 1966  4 Sheets-Sheet 1

INVENTOR.
DONALD C. LINDLEY
BY
Leonard H. King
ATTORNEY.

July 15, 1969 D. C. LINDLEY 3,455,760
METHOD FOR APPLYING HANDLES TO PLASTIC BAGS
Filed July 5, 1966 4 Sheets-Sheet 3

INVENTOR.
DONALD C. LINDLEY
BY
Leonard H. King
ATTORNEY.

July 15, 1969 D. C. LINDLEY 3,455,760
METHOD FOR APPLYING HANDLES TO PLASTIC BAGS
Filed July 5, 1966 4 Sheets-Sheet 4

INVENTOR.
DONALD C. LINDLEY
BY Leonard H. King
ATTORNEY.

3,455,760
METHOD FOR APPLYING HANDLES TO PLASTIC BAGS
Donald C. Lindley, Greenlawn, N.Y., assignor to Cellu-Craft Products Corp., New Hyde Park, N.Y.
Filed July 5, 1966, Ser. No. 562,671
Int. Cl. B32b *31/10;* B29c *24/00, 17/10*
U.S. Cl. 156—264                                                            7 Claims

ABSTRACT OF THE DISCLOSURE

A method of forming handles from a continuous roll of material, inserting the handles between a pair of plastic webs, sealing the handles to the plastic webs and forming handled bags.

---

This invention relates to bags provided with handles and more particularly to a method and apparatus for automatically and continually heat sealing handles to plastic bags.

Thin film plastic bags are presently popular as a packaging medium and as a premium item. The outer surface of the bag may be provided with an advertising message and they may be made colorful by suitable design and printing. The bags may be made reusable thus offering a convenience to the purchaser of the product contained therein. Additionally, when the bag is reused the producer of the merchandise benefits from the additional advertising. The bags are foldable and may be stored without deterioration and in a minimum of space.

In order to be practical as a premium item and have utility in the merchandising art, the bags must be fabricated inexpensively. Preferably the bag and the handle therefor should be assembled automatically and continually. The present invention is directed towards an improved method and apparatus for doing this. In one embodiment the present apparatus is an adjunct to a bag making machine, although it is to be understood that the invention, with the addition of input and takeoff mechanism, will function as a complete, self-sufficient machine. The handles are fed and heat sealed to a moving web of plastic film that is then formed into a bag. As will be explained hereinafter, the bag used by way of example is gusseted at the top and open at the bottom for subsequent filling.

Essentially the present invention comprises a workpiece supporting station in the form of a horizontal table across which the continuous web of double thickness polyethylene film is passed. Polyethylene coated paper handles formed from a pair of severable back-to-back webs, are also continually directed across the workpiece supporting station at right angles to and in the same plane as the movement of the film web. Suitably positioned opening means separate the edges of the moving film and maintain the bag web in this condition while it traverses the table. Timed advance means feed in a pair of plastic coated paper webs which are die cut to form the handles. Means are provided for severing the handles from their respective webs while substantially simultaneously, heat sealing means secure one handle to each of the layers of the plastic film. The present invention, to be more fully described hereinafter, has a capacity in the order of 100 assembled bags per minute. Further, the present invention is provided with adjustment means to accommodate a wide range of bag sizes and to time or synchronize the handle-to-bag assembly rate with the rate of work of the preceding and succeeding equipment.

Additional features of this invention include the use of offset heaters whereby the handles are sealed to the plastic film on two successive strokes of the handle feed apparatus. Further an intentional overstroke of the handle insertion components compensates automatically for handle dimension variations. Instead of utilizing preformed handles the instant invention provides an in line die cutting apparatus. A punch press having inexpensive steel rule dies is used to punch out the handles, thus adding versatility to the operation and reducing the operation to one step.

As an optional feature a glue gun can be added between the two polycoated handle webs as they come through the pinch rolls. This will add strength to the handles during marketing and, if glue is placed on the outboard edges of the handles, only the bag will be strengthened. Accordingly, when the bag is opened it is less likely that it will be torn. The same glue gun can also be used to seal the package if desired.

The additional and optional features referred to directly hereinabove will be described in conjunction with a gusseted bag. By way of example, the bag is defined by an inwardly directed fold of material in the area of the handles. Therefore, the bag to be discussed is closed at the top and open at the bottom for subsequent filling and sealing.

Accordingly, it is an object of the present invention to provide improved, automatic and continual means to heat seal a pair of handles to plastic bags.

It is another object to provide high speed apparatus to heat seal a pair of handles to plastic bags.

An additional object is to provide an improved, heat sealable plastic bag and handle assembly apparatus that may be utilized with existing plastic bag making machinery.

A particular object is to provide combined handle cutoff and sealing means.

Still another object is to provide handle feed means synchronized with the motion of the handle cutoff and sealing means.

A further object is to provide means that will permit the apparatus of the present invention to assemble a pair of handles to bags in a range of different sizes.

An additional object is to provide an improved high speed method for assembling plastic coated handles to plastic bags.

Another object is to provide an automatic and continual method for assembling heat sealable handles to plastic bags.

A particular feature of this invention is the inclusion of in line die cutting means for punching out the handles during movement thereof.

Another feature of this invention is the use of offset heating means for sealing the handles to the plastic film on successive strokes of the handle feed means.

Yet another object is to provide an intentional overstroke of the handle insertion cylinder whereby compensation is automatically made for variations in handle length.

An optional feature of the present invention is the use of glue application means in conjunction with the handle web feed means.

These and other features, objects and advantages of the invention will, in part, be pointed out with particularity and will, in part, become obvious from the following more detailed description of the invention taken in conjunction with the accompanying drawing which forms an integral part thereof.

In the various figures of the drawing like reference characters designate like parts.

Figure 5:
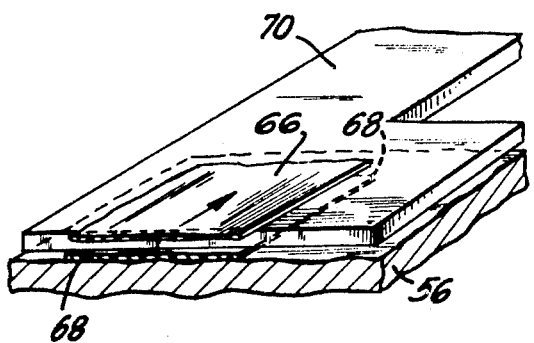
Figure 12:
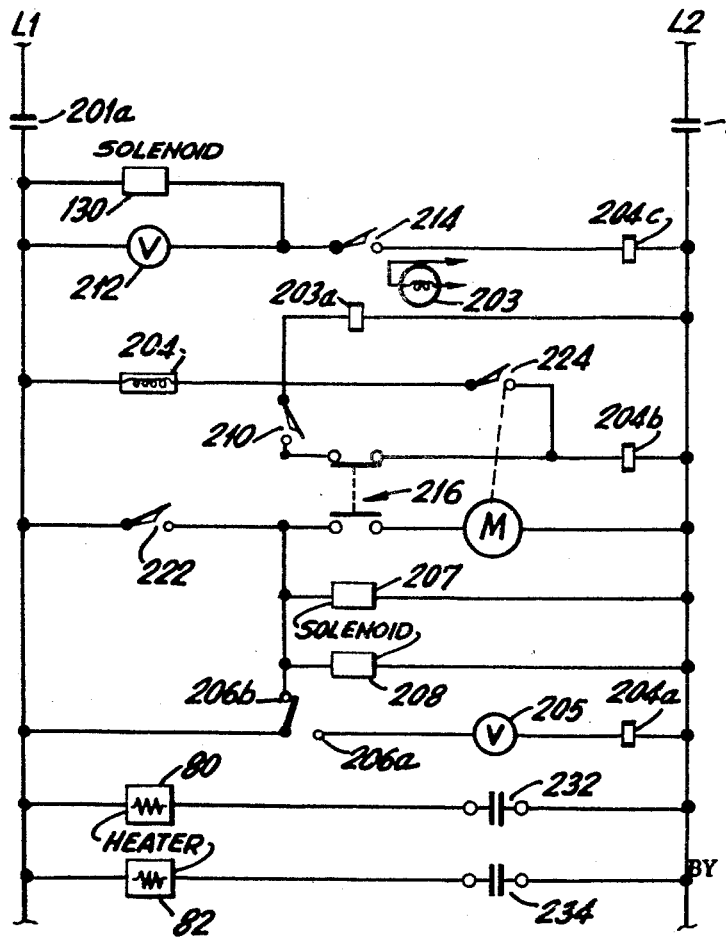

FIG. 5 pictorially illustrates the relationship of a pair of longitudinal bag web edges and the spacing means therefor;

FIGS. 6–11 are enlarged detail views of various components and subassemblies of the instant invention;

FIG. 12 is a schematic diagram of the circuitry used in conjunction with the present invention.

Figure 13:
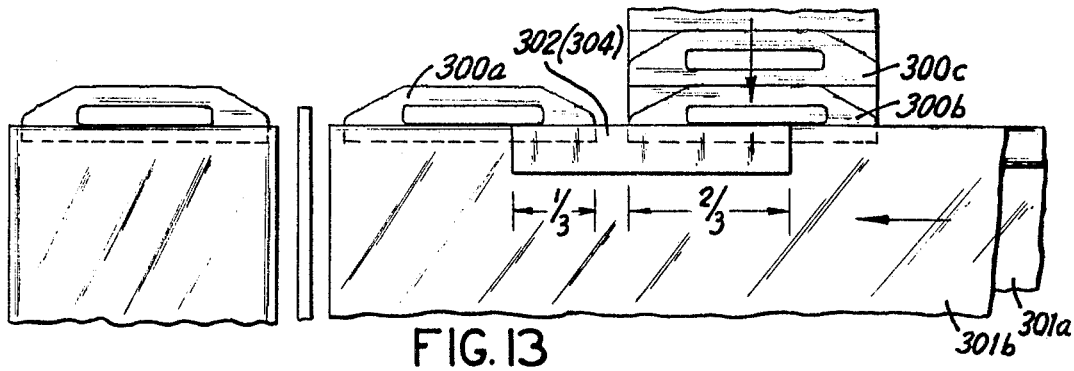
Figure 14:
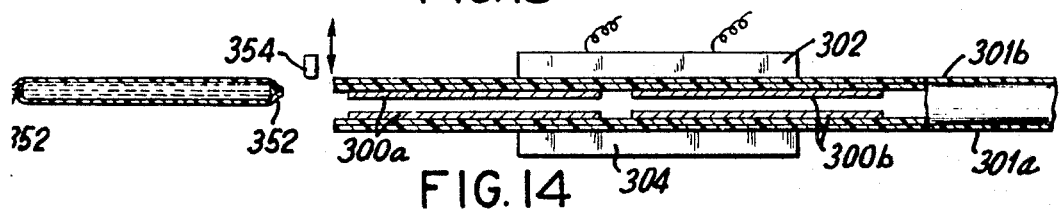
Figure 15:
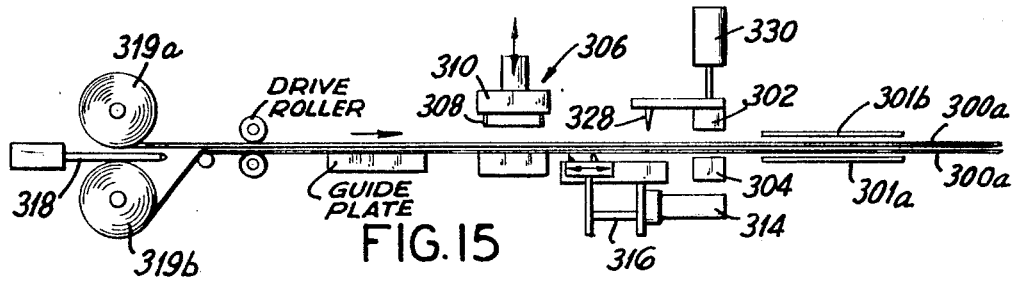
Figure 16:
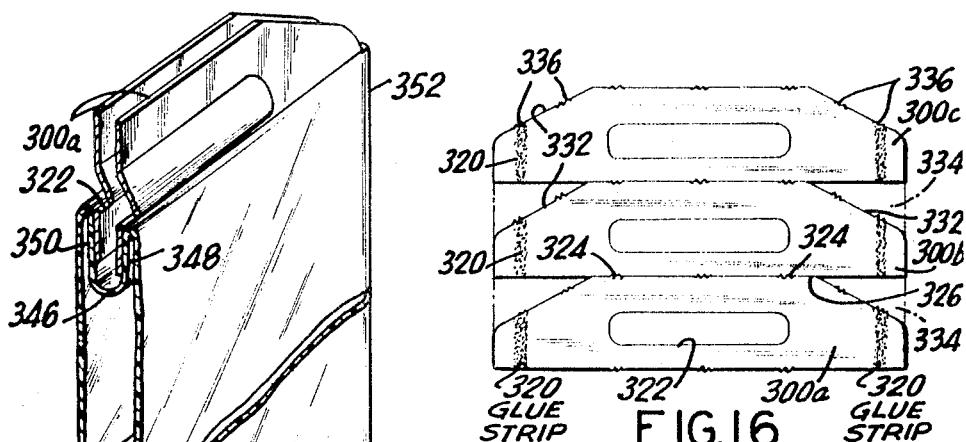
Figure 17:
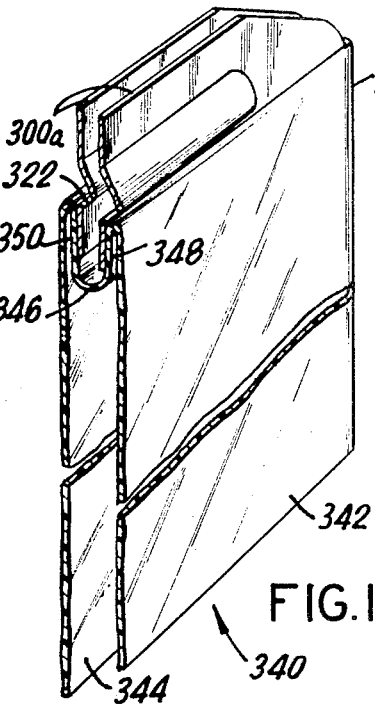

FIG. 13 and FIG. 14 are plan and side views, respectively, schematically illustrating the relationship of the handles to the heating means;

FIG. 15 is a schematic side elevational view of the apparatus including the in line die cutting means;

FIG. 16 is a plan view of a typical handle having glue strips applied thereto; and FIG. 17 is a sectional view through an assembled bag and handle.

In the following description the handles are of the heat sealable type and may comprise a paper base with a polyethylene coating, or may be a polyethylene handle. While polyethylene is a currently preferred material, other suitable heat sealable materials may be employed.

Figure 1:
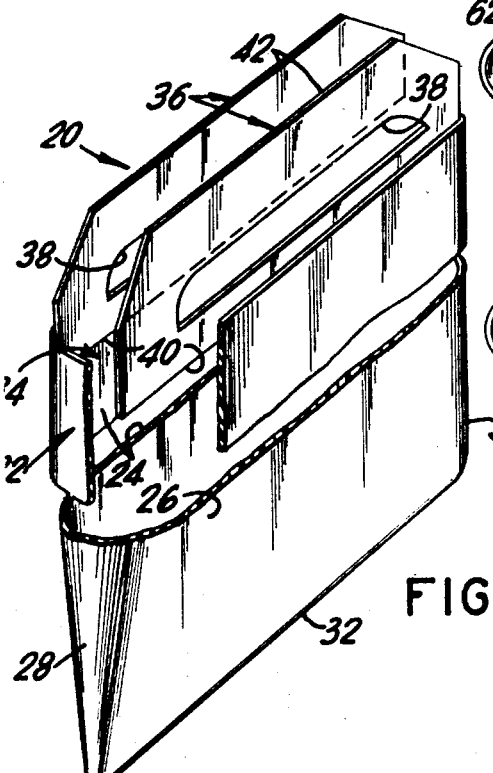
FIG. 1 is a pictorial view partially broken away of a plastic bag and a pair of handles assembled in accordance with the present method and by the present apparatus.

Referring now to the drawing and in particular to FIG. 1, it will be seen that in one embodiment of the invention a typical bag and handle assembly 20 is comprised, in part, of a bag 22, defined by confronting plastic film layers 24 and 26, closed side edges 28 and 30, a closed bottom end 32 and an open top end 34. Assembly 20 is completed by a pair of handles 36, each one of which is secured proximate open end 34 of bag 22. The generally rectangular plastic coated handles 36 are each provided with an elongated aperture 38 parallel to both the lower or leading edge portion 40 and the upper or trailing edge portion 42.

The bag is polyethylene, as is at least a portion of one planar surface of each of the handles. As will be described more fully hereinafter, these similarly surfaced areas are heat sealed to each other. That is, the plastic coated leading edge portion 40 of one handle is secured to layer 24 proximate the open end of the bag and the plastic coated leading edge portion of the other handle is secured to layer 26 proximate the open end of the bag in the FIG. 1 embodiment. Elongated aperture 36 in both handles serves as means to grip the assembly and also cooperates in the feeding of the handle web. In the first embodiment of the present invention to be described hereinafter, the bag web is in the form of a continuous, center folded length of polyethylene sheet. The handle may be cardboard and only the surface thereof that is in contact with the layer forming the wall thickness of the bag need be plastic coated.

Figure 4:
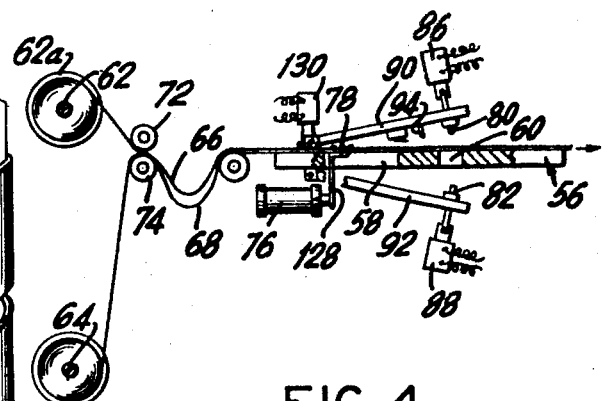
FIG. 4 is another schematic elevational view taken alone line 4—4 of FIG. 2.
Figure 3:
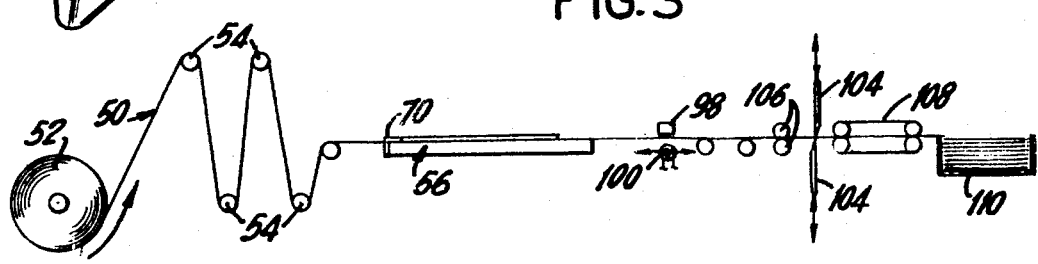
FIG. 3 is a schematic elevational view taken along line 3—3 of FIG. 2.
Figure 2:
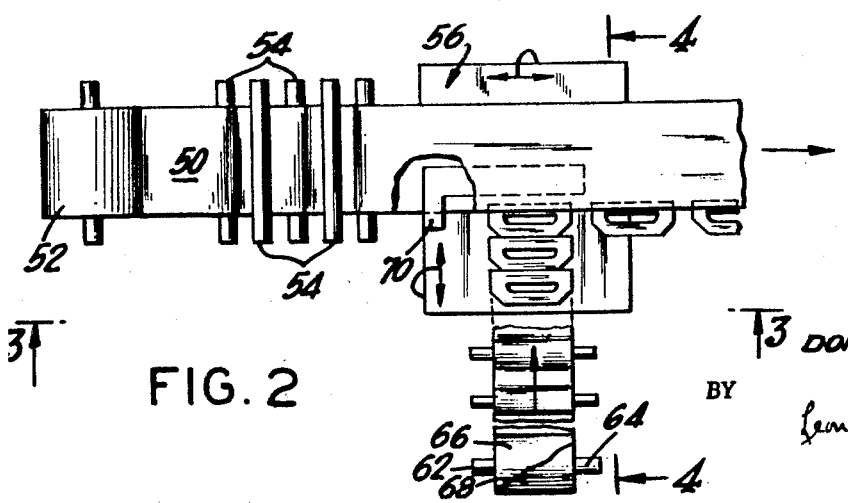
FIG. 2 is a schematic plan view of the handle-attaching apparatus comprising the present invention.

The structure comprising the apparatus of the present invention is schematically illustrated in FIGS. 2–4. For purposes of explanation, a length of centerfolded, double thickness polyethylene film 50 is shown disposed about supply roller 52 although other delivery means may be employed.

Film 50 travels in a serpentine path and traverses a plurality of dancer rollers 54 which maintain the proper tension on the film before crossing a workpiece supporting station in the form of a flat, horizontal surface or table 56. A pair of slots 58 and 60 (FIG. 4), the lengthwise dimensions of which are parallel to the direction of travel of film web 50, are provided in the table for purposes to be explained in connection with the operation of the apparatus and the method of applying the handles.

A pair of parallel supply rolls 62 and 64 support upper and lower webs of severable handles 66 and 68, respectively. Flanges 62a and 64a, respectively, provide means for maintaining the supply rolls centered. The handles are adapted to be fed onto table 56 in the same plane as the bag web but in a transverse direction thereto. When the pair of handle webs reach table 56 the polyethylene coated surface of upper web 66 is facing upwardly while the comparable surface of lower web 68 is facing downwardly. Both webs are fed onto the table incrementally and in timed relation to the movement of the bag web.

Referring once again to the movement of the bag web, a separator 70 is positioned on table 56 in the path of one longitudinal edge of the bag web. As noted hereinabove, the bag web is initially either in tubular form or in center folded, bilayer form. If the web is tubular, it must be slit along a line parallel to its length before it can be fed across the work table. Of course, if it is center folded, it may be utilized as it comes from the supply source. L-shaped separator 70 is spacedly positioned over the table 56 proximate the point where the slit or open edge of the web starts its travel across the table and is continuous to a point where the web leaves the table. Thus when a portion of the bag web is on the table, the longitudinal, free edges thereof will be spaced from each other by a dimension sufficient to receive the leading pair of handles. FIG. 5 schematically and pictorially illustrates the action of the separator. With the two layers of the bag web separated as shown, the handle web may be transversely fed into juxtaposition therewith. Rollers 72 and 74, one of which is driven, are positioned proximate the level of the table in order to deliver the handle web to the bag web. It will be seen that a loop is provided in the handle web just subsequent to the drive roller station. The timing of actuator 76 is dependent upon other manufacturing considerations such as the width of the bag and handle, the speed of the bag web and the production rate of the succeeding machine that works on the bag and handle assembly. Means to time actuator 76 will be discussed more fully hereinafter in conjunction with the circuitry of the apparatus.

Immediately subsequent to the incremental feed of the handle webs, the spacedly opposed longitudinal edges of the bag web are secured by heat sealing to the leading handle and substantially simultaneously the leading handle is severed from the remainder of the web. When in web form, edges 40 and 42 are abutting. It is along this common line that the severing is done. Upper and lower heaters 80 and 82 are employed to secure the handles to the web. The heaters are suitably timed with relation to the movement of handle actuator 76 and are disposed above and below slot 60 in table 56. The lower heater projects through the table in order to contact the lower layer of the bag web. Solenoids 86 and 88 may advantageously be used to move heaters 80 and 82, respectively, into contact with the abutting surface of the bag web and the handles. As in the case of the actuator moving means, mechanical or hydraulic means may be employed to bring the heaters into contact with the bag web. Further, the type of motion of the heaters may be either arcuate or linear. Either motion may be utilized with good effect although, for purposes of illustration, arcuate motion is shown with heaters 80 and 82 mounted on pivotal brackets 90 and 92, respectively. Means to time the motion of the heaters will be discussed more fully hereinafter in connection with the circuitry of the apparatus.

In order to facilitate continual production, the handle cutoff is performed substantially simultaneously with the heat sealing of the handles and the plastic film web. For convenience of illustration, cutting means 94 is shown depending from the underside of pivotally mounted, upper heater support bracket 90. Cutting means 94 may be sized to sever the entire width of the handle web. Alternatively the handles, which could be preperforated by conventional rotary cutting dies, could be severed by a notched knife having cutting edges aligned with the lands between the perforations.

After the handles have been severed from their web and heat sealed to the bag web, the assembly then passes between an adjustably positionable photocell 98 and light source 100. Action of the knife assembly 104 is controlled by the photocell which senses a portion of the bag and is timed to sever each bag assembly from the moving web. At substantially the same time, heating means 106, disposed parallel to knife assembly 104, heat seals the bags to form the closed side edges 28 and 30. Conveyor system 108 delivers the cut assemblies to suitable stacking and storage means 110.

Figure 6:
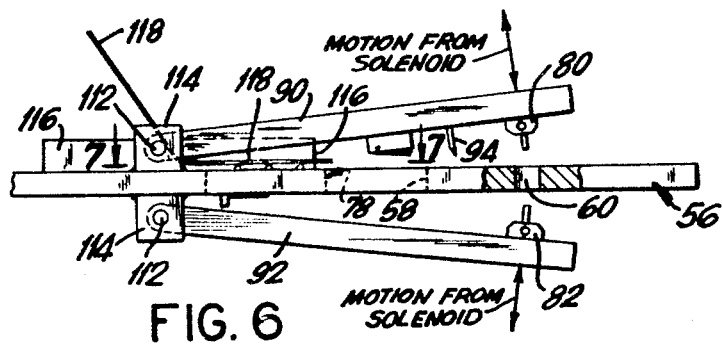
Figure 7:
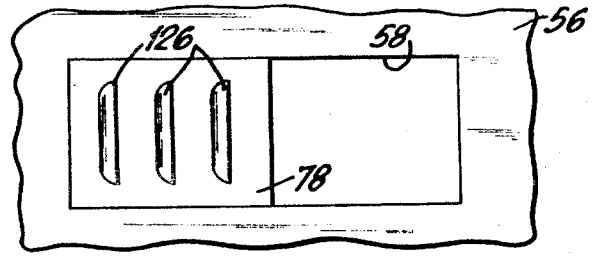
Figure 8:
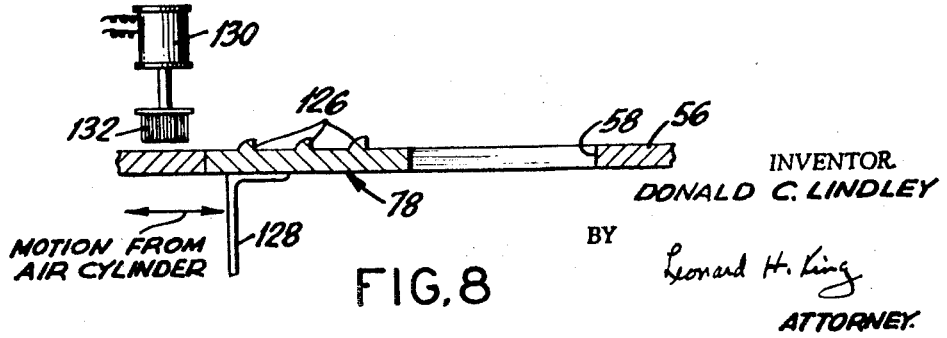

The foregoing rather generalized description pertains particularly to the method of incrementally feeding and applying polyethylene coated handles to a discontinuously moving web of polyethylene film. Now, in conjunction with FIGS. 6-11, various structural features of the apparatus will be discussed. Referring to FIGS. 6, 7 and 8, it will be seen that upper and lower heater support brackets are pivotally mounted on stub shafts 112 journaled in bearing blocks 114. Table 56 rigidly supports the bearing blocks as well as a pair of parallel handle guide means 116 and a pair of handle hold down bars 118. In combination, guide means 116 and hold down bars 118 define a channel through which the handle webs slide when they travel between their respective supply rolls and the workpiece support station where heat is applied.

The blade portion of the upper and lower heating means 80 and 82 are each provided with a Teflon fluorocarbon coated glass fibre cloth covering 120 which prevents the heating bars from burning through the polyethylene film and becoming contaminated from the polyethylene.

Referring particularly to FIG. 7 and FIG. 8, the means to incrementally advance the opposed handle webs into juxtaposition with the bag web is shown. Opening 58 in table 56 is substantially larger than opening 60 so that sliding indexing member 78 may be accommodated. On the upper surface of member 78, there is provided at least one but preferably three claws 126 adapted to engage slot 38 in the body of each of the handle pairs. The purpose of the claws is to advance the handle webs in timed relation to the bag web movement. Provision of more than one claw also assures that upper and lower webs 66 and 68 will be accurately superimposed one above the other. Flanges 62a and 64a prevent any lateral straying of the handle webs. The leading or pushing edge of each claw is substantially perpendicular to the plane of the table and member 78 while the top surface is sloped. In operation, the first three sets of handles are engaged by the claws whereby the upper and lower handle webs are properly aligned with each other. They are then advanced between a pair of transversely spaced side guide means 116 and centrally located hold down means 118 so that the leading handles are positioned between the opposed layers of the film web. When member 78 retracts it slides rearwardly with respect to the handles in order to reengage the handle webs for the next cycle.

Member 78 is connected to and actuated by the piston of air cylinder 76 by means of a simple bracket 128. FIG. 8 also illustrates the utilization of a solenoid 130 to hold down the web of handles. After the leading pair of handles is severed by knife 94 and secured to the bag web by heating members 82 and 84, solenoid 130, having a brush-like member 132 at the lower end of its armature, is activated. The brush bears against the handle web so that indexing member 78 may be retracted without displacing the handle web.

Figure 9:
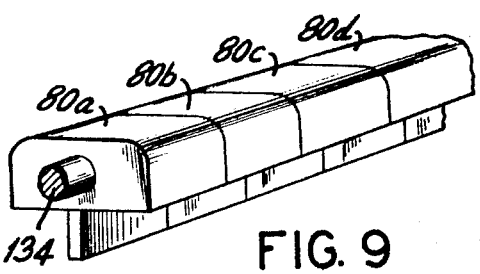

FIG. 9 pictorially illustrates the ganged heat sealing members and is to be considered typical of both the upper and lower heaters. However, for the purposes of this description, reference will only be made to upper heating member 80. The heater may be made in several sections 80a, 80b, 80c, 80d, etc. each of which is approximately one inch long. Where a multi-sectioned heater is used, it has been found convenient to have a solid center section approximately four inches long and each of the elements on either side thereof is made pivotable about support bar 134. Thus, for the smallest size bag likely to be made on the machine only the center element is used and the others are swung out of the way. To fabricate, say, a six-inch wide bag, one element on each side of the center group will be pivoted downward. In a like manner, the heating elements may be enlarged for other bags. Alternatively, a single length heater element could be used for all size bags.

Figure 10:
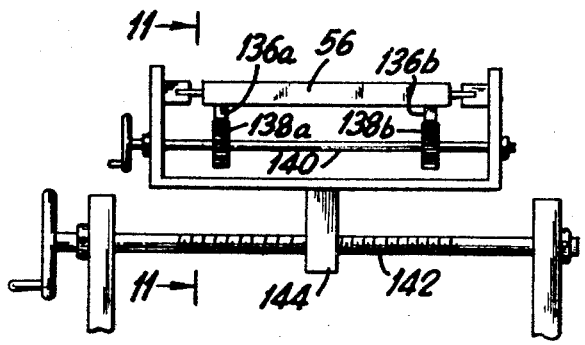
Figure 11:
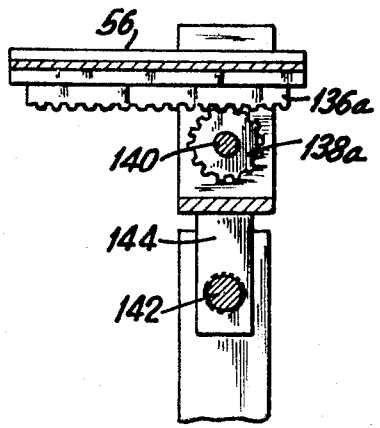

FIG. 10 and FIG. 11 illustrate means to vary the position of the table 56 so that bags of different sizes may be fabricated in timed relation to the complementary bag web feeding and takeoff machinery. Table 56 is provided with rack members 136a and 136b integral with each side thereof and parallel to the direction of movement of the bag web. Gears 138a and 138b are rotatably journaled in frame members and mate with the racks whereby rotation of connecting rod 140 will displace the table parallel to the movement of the bag web. Transverse movement of the table that is parallel to the handle web feed or perpendicular to the bag web feed is accomplished by rotation of a lead screw 142 which mates with a nut 144 secured beneath the table.

Electrical operation of the machine (a) Operation is initiated by the closing of main switch contacts 201a, 201b.

(b) A signal from the bag machine applied to relay coil 203 causes contacts 203a to close, thereby energizing main relay coil 204. In turn, contacts 204a and 204b close while contact 204c opens.

(c) The closing of contacts 204a energizes solenoid valve 205 causing air cylinder 76 to extend so as to feed a handle into the bag. At the end of the stroke switch 206 is moved from position (a) to position (b) opening the circuit to solenoid valve 205.

(d) In position (b) switch 206 completes a circuit to energize the upper and lower heat sealer solenoids 207 and 208, respectively, to bring heat sealing bars 82 and 84 into heat position against the handle and bag.

(e) As the heat sealing bars move into position, microswitch 210 is opened deenergizing solenoid coil 204 opening contacts 204a and 204b and closing contacts 204c to energize hold down solenoid 130 and air cylinder solenoid valve 212 to cause the insert bar to retract. Upon retraction, limit switch 214 is opened to deenergize the line. When the insert bar is advanced in the subsequent cycle limit switch 214 closes but at this time the contacts 204 are open.

(f) Ig extended heating time is required for a given set of materials then the operator places switch 216 in position (b) to energize time delay motor 220 when limit switch 222 is closed by the insert bar when the latter reaches the extreme forward position. After the preset time a conventional cam driven by the time delay motor 220 opens limit switch 224.

(g) the heaters 82 and 84 are controlled by thermostats 232 and 234, respectively.

FIGS. 13-17 will now be used to describe additional features of this invention. In FIG 13 and FIG. 14 a preferred apparatus is shown for heat sealing the handles to the bags. Two pairs of handles, 300a and 300b, are illustrated as having been inserted between the opposed layers 301 of plastic film by two successive strokes of the handle insertion apparatus. Handles 300a were inserted on the first stroke and, as will now be explained, were partially heat sealed to the bag web. When the bag web moved to ths left, as shown by the arrow in FIG. 15, it carried handles 300a and made room for the perpendicular insertion of following handles 300b.

Offset upper and lower heater bars 302 and 304, respectively, are positioned in spaced opposition to the film layers. In suitably timed relation with the aforementioned handle movement the upper heater bar is brought down on the film layers and the lower heater bar which is stationary. By this arrangement the trailing ⅓ portion of handles 300a and the leading ⅔ portion of handles 300b are simultaneously heat sealed to the film layers. After the next successive stroke of the insertion apparatus the trailing ⅓ portion of handles 300b are heat sealed at the same time as the leading ⅔ portion of handles 300c (FIG. 16). The film web, of course, moves transversely to the handle web movement as indicated by the directional arrows.

FIG. 15 illustrates several preferred structural features of this invention. Instead of using handles that have been precut and rewound on supply rolls, a die cutter 306, in line with the movement of the handle web, is provided. Inexpensive steel rule dies 308 are used in the upper, movable section 310 of the die cutter which is in opposition to a lower die section 312. By using nonpunched webs on the supply rolls the material is stronger and less likely to be torn. In addition the steel rule dies are inexpensive and relatively easy to change should modifications be required during a production run. As shown in the drawing, the die cutting step takes place prior to the insertion of the handles between the film layers.

The means to insert the handles between the film layers is shown in FIG. 15 as an air cylinder 314 having the upwardly extending claws previously described secured to piston 316 thereof. In the embodiment illustrated the length of the piston stroke is 2¼ inches, whereas the width dimension of the handle (between the two longer edges) is only 2 inches. The reason for the piston overstroke is to automatically compensate for slight variations in the handle dimension. The foregoing dimensions are given by way of example only and are not intended to be limiting. It is preferred, however, to intentionally introduce a limited overstroke of the cylinder's piston.

FIG. 15 also illustrates the use of glue applying apparatus 318. As the webs are being taken off their respective supply rolls 319a and 319b, an adhesive is applied to at least one of the confronting web surfaces. As shown in FIG. 16, two glue strips 320 are applied proximate the outboard edges. This feature not only adds strength to the handles but it also strengthens the bag and makes it less subject to tearing when it is opened. The glue applicators may also be used to seal the package.

FIG. 16 illustrates one form of handle that may be applied. A hand opening 322 is made during the die punching operation and the periphery of the handle is delineated at the same time. It should be noted that successive handles 300a, 300b, 300c, etc., remain connected to each other at several locations 324 on the edge 326 that is common to adjacent handles. These connections are cut through by a suitably located knife 328 (FIG. 15) that is movable together with the upper heater bar. The cutoff knife, as well as the air cylinder 330 that actuates them, is shown schematically in FIG. 15.

The handle illustrated has, for esthetic purposes, two sloping edges 332 that extend from common edge 326. The two substantially triangular areas 334 thus defined between adjacent handles may be removed by suction means or may be manually torn off by an operator after the bag is assembled to the handles. These triangular areas are cut during the die punch operation. If they are permitted to remain, the operator need only tear through two connecting points 336.

A gusseted bag 340, such as shown in FIG. 17, may be used with the present invention. The bag is a single sheet of plastic having two opposed layers 342 and 344 with a common edge 346. The layers are each folded over to form legs 348 and 350, respectively, with the common edge 346 therebetween. The handles are seat sealed to the legs which are spaced from each other by the apparatus hereinabove described. It will be seen then that the upper end of the bag is closed by virtue of the inwardly folded edge which forms the gusset. The side edges 352 of the bag are closed at the same time the bags are separated from each other by the transversely disposed and suitably timed heating means 354 shown in FIG. 13. The bottom of the bag is left open for filling purposes and for convenience leg 344 is made slightly longer so that it may be folded over if desired.

Having thus disclosed the best embodiment of the invention presently contemplated, it is to be understood that various changes and modifications may be made by those skilled in the art without departing from the spirit of the invention.

What is claimed is:
1. In a method of securing pairs of handles to a double thickness bag web, the handles being initially in the form of continuous webs, wherein the method includes the steps of separating two opposed longitudinal edges of the bag web, feeding pairs of handles in a stepwise manner between the spaced edges of the bag web, heat sealing the handles to the spaced edges of the bag web and separating the assembled handles and bag from the bag web, the improvement therein comprising the step of die cutting the handles just prior to the insertion of the handles between the opposed edges of the bag web.

2. The method in accordance with claim 1 wherein said die cutting step comprises partially severing the handles from their respective webs.

3. The method in accordance with claim 1 wherein said improvement comprises heat sealing a portion of each handle subsequent to the feeding thereof, the remainder of the handle being heat sealed subsequent to the feeding of the next successive pair of handles.

4. The method in accordance with claim 3 wherein said heat sealing step comprises the sealing of approximately ⅔ of a first pair of handles and then sealing the remainder of the first pair of handles at the same time the ⅔ portion of the next successive pair of handles is being heat sealed.

5. The method in accordance with claim 1 wherein the improvement further comprises the step of applying an adhesive to at least one of the opposed confronting surfaces of the handle web prior to the die cutting thereof.

6. The method in accordance with claim 5 wherein said glue applying step comprises applying glue to the outboard longitudinal edges of at least one of the confronting surfaces of the handle webs.

7. The method in accordance with claim 1 wherein said improvement further comprises the step of transversely sealing the bag web subsequent to the application of the handles whereby individual bags, each having a pair of handles, is defined.

References Cited
UNITED STATES PATENTS

| | | | |
|---|---|---|---|
| 2,597,885 | 5/1952 | Marks | 156—264 |
| 3,128,035 | 4/1964 | Teweles | 156—583 |

DOUGLAS J. DRUMMOND, Primary Examiner